UNITED STATES PATENT OFFICE.

HUGO SCHMIDT, OF BADEN, GERMANY.

STERILIZED CATGUT THREAD.

No. 887,130.     Specification of Letters Patent.     Patented May 12, 1908.

Application filed April 2, 1906. Serial No. 309,560.

*To all whom it may concern:*

Be it known that I, HUGO SCHMIDT, a subject of the German Emperor, and resident of Mannheim R6 Nr. 6b., Baden, Germany, have invented a Sterilized Catgut Thread, of which the following is a specification.

The methods hitherto employed for sterilizing the catgut threads commonly used in surgery for fastening ligatures and for sewing have proved unsatisfactory, either because the catgut has not been completely freed from fatty substances, and is consequently not thoroughly permeated by the sterilizing liquid or because the treatment to which the catgut is subjected renders it friable or otherwise impairs its quality and consequently diminishes its utility.

Among the various means for sterilizing catgut already proposed is the employment of iodin solution. Catgut, however, when immersed in an aqueous solution of iodin in iodid of potassium curls up and crumples. In order to obtain any thread whatever it is necessary, before subjecting the catgut to the action of the iodin solution, to wind it upon a glass bobbin, and even when thus wound catgut prepared in the manner referred to, in a very short time not exceeding from 2 to 3 weeks becomes so friable, and brittle as to be practically worthless.

Now the above mentioned disadvantages can be entirely obviated by the addition of formaldehyde to the aqueous solution of iodin in iodid of potassium and even ordinary catgut threads, in the condition in which they are placed on the market, when immersed in such a solution of formaldehyde and iodin completely retain their form and flexibility while as proved by bacteriological tests, they at the same time become completely sterilized.

The process to which this invention relates moreover possesses the further advantage that catgut sterilized in this manner, can, when removed from the sterilizing solution, be dried, and kept for any length of time in a sterilized packing without losing its flexibility. It has not heretofore been possible by means of an iodin solution to obtain catgut that is at once durable, dry, and thoroughly sterilized. The German Patent No. 127515 it is true, describes a process for preparing an antiseptic by treating gelatin first with a solution of iodin in iodid of potassium and then with formaldehyde. According to the process described in the said specification, however, as therein distinctly stated, the formaldehyde is used only for hardening the gelatin, and that is, moreover, obvious from the further statement that for the formaldehyde there may be substituted other similar substances, as for instance, chromalum. In the process to which this invention relates the function of the formaldehyde is however of a totally different character. When a catgut thread is treated with formaldehyde it swells and after being removed from the solution and dried it soon becomes brittle and friable, and, as the formaldehyde evaporates it loses its sterility and is thus rendered useless for the purpose in question. If, however the formaldehyde is added to the solution of iodin, the result as already stated, is quite different, the threads then completely retaining their form and flexibility, while their sterility is maintained by the action of the iodin, even after the formaldehyde has evaporated. The combined use of iodin solution and formaldehyde thus produces a distinctly novel and characteristic result.

In carrying out the invention a concentrated stock solution is prepared by dissolving one part by weight of iodin and one part by weight of iodid of potassium in three parts by weight of distilled water, to which there is added from 0.4 to 0.5 part by weight of a 40 per cent. solution of formaldehyde. Is is advantageous but not essential to add one part by weight of glycerin. The solution actually used is prepared by diluting the stock solution by the addition for each part of iodin therein, of 100 parts of cold water that has previously been boiled. The crude catgut threads are immersed in this solution for from three to five days and are ready for use in from 5 to 8 days. They may be removed from the solution immediately before their use or they may be dried and kept ready to hand in a suitable sterilized envelop.

What I claim as my invention and desire to secure by Letters Patent is:—

A sterilized catgut thread impregnated with an antiseptic compound consisting of an aqueous solution of iodin in iodid of potassium containing formaldehyde and adapted to remain permanently pliable and tough and to retain its form.

In testimony whereof I have hereunto signed my name to this specification in the presence of two subscribing witnesses.

HUGO SCHMIDT.

Witnesses:
H. W. HARRIS,
JOS. H. LEUTE.